United States Patent
Shiffer et al.

(10) Patent No.: US 12,306,966 B2
(45) Date of Patent: May 20, 2025

(54) SECURE DISTRIBUTION OF EMBEDDED POLICY

(71) Applicant: Atscale, Inc., San Mateo, CA (US)

(72) Inventors: Jason L Shiffer, Wilmot, NH (US); Kaushik Shanadi, Washington, DC (US); Dustin W. Webber, Dorchester, MA (US); Patrick J. Toole, Wellington, FL (US)

(73) Assignee: AtScale, Inc., Boston, MA (US)

( * ) Notice: Subject to any disclaimer, the term of this patent is extended or adjusted under 35 U.S.C. 154(b) by 324 days.

(21) Appl. No.: 17/733,035

(22) Filed: Apr. 29, 2022

(65) Prior Publication Data

US 2022/0350900 A1  Nov. 3, 2022

Related U.S. Application Data

(60) Provisional application No. 63/182,920, filed on May 1, 2021.

(51) Int. Cl.
```
G06F 21/60    (2013.01)
H04L 9/40     (2022.01)
H04L 41/28    (2022.01)
```

(52) U.S. Cl.
CPC ............ *G06F 21/604* (2013.01); *H04L 41/28* (2013.01); *H04L 63/20* (2013.01); *G06F 2221/2141* (2013.01)

(58) Field of Classification Search
CPC .............. G06F 21/604; G06F 21/629; G06F 2221/2141; H04L 41/28; H04L 41/0894; H04L 63/20; H04L 63/0442; H04L 63/105; H04L 63/12; H04L 63/0263
See application file for complete search history.

(56) References Cited

U.S. PATENT DOCUMENTS

| | | | | |
|---|---|---|---|---|
| 2006/0242685 A1* | 10/2006 | Heard | ................... | H04W 12/35 |
| | | | | 726/3 |
| 2008/0319771 A1* | 12/2008 | Shriver-Blake | ....... | H04L 63/105 |
| | | | | 705/300 |
| 2017/0357496 A1* | 12/2017 | Smith | ................... | H04L 9/0662 |
| 2018/0227183 A1* | 8/2018 | Crudele | ............. | H04L 41/0672 |
| 2020/0259864 A1* | 8/2020 | Soffer | ................. | G06F 21/604 |
| 2022/0124122 A1* | 4/2022 | Kelly | .................... | H04L 9/3268 |
| 2022/0166620 A1* | 5/2022 | Oladimeji | ............... | H04L 63/04 |

FOREIGN PATENT DOCUMENTS

| | | | | | |
|---|---|---|---|---|---|
| CN | 105550590 A | * | 5/2016 | | |
| KR | 20230098156 A | * | 7/2023 | ............... | H04L 9/40 |
| WO | WO-0176181 A2 | * | 10/2001 | ........... | G06F 16/951 |
| WO | WO-2015047127 A1 | * | 4/2015 | ............. | G06F 12/02 |
| WO | WO-2016060068 A1 | * | 4/2016 | ............. | G06F 21/60 |
| WO | WO-2023278956 A1 | * | 1/2023 | ........... | G06F 21/602 |

* cited by examiner

*Primary Examiner* — Sarah Su
(74) *Attorney, Agent, or Firm* — Armis IP Law, LLC

(57) ABSTRACT

An embedded policy takes the form of an executable entity local to the endpoint or end application attempting to access target data. The executable entity is compiled from a declarative remote policy based on objects, subjects and actions, and includes a library and API (Application Programming Interface) in conjunction with a client application seeking access according to the policy. Evaluation of appropriate access is resolved with a local function call to the executable entity, rather than a network message exchange, thus providing data target access according to the policy without incurring network latency.

18 Claims, 3 Drawing Sheets

SECURE DISTRIBUTION OF EMBEDDED POLICY

This patent application claims the benefit under 35 U.S.C. § 119(e) of U.S. Provisional Patent App. No. 63/182,920, filed May 1, 2021, entitled "SECURE DISTRIBUTION OF EMBEDDED POLICY," incorporated herein by reference in entirety.

BACKGROUND

Electronic databases store tremendous amounts of data, and have been doing so for several decades ever since the cost of computer hardware came within reach for most businesses and consumers. Large "data warehouses" now store vast amounts of data stored and indexed according to a storage format, often according to tables or multidimensional arrangements and indices that allow access to the data though interfaces and software defined by the particular vendor. Databases, whether denoted as a database, data warehouse, disk farm or storage network, typically employ a policy for designating access to various entities for safeguarding sensitive data. Multidimensional databases organize many dimensions, or data fields, across different data tables, often in different physical storage volumes and locations. Access control to this data therefore extends to these additional physical locations in order to maintain the integrity of the multidimensional data.

SUMMARY

An embedded policy takes the form of an executable entity local to the endpoint or end application attempting to access target data. The executable entity is compiled from a declarative remote policy based on objects, subjects and actions, and includes a library and API (Application Programming Interface) in conjunction with a client application seeking access according to the policy. Evaluation of appropriate access is resolved with a local function call to the executable entity, rather than a network message exchange, thus providing data target access according to the policy without incurring network latency.

Configurations herein are based, in part, on the observation that policy enforcement in access based systems becomes increasingly important when one or more data targets serves many users and the access afforded to each user may differ. Unfortunately, conventional approaches to coordinated data access control suffers from the shortcoming that they do not provide a clean and secure method for distributing executable (embedded) policies. In a system where authorization policies are distributed for execution at endpoint sites, instead of enforcement from network message exchange with a central server, it is beneficial to ensure that the distributed executable entities are not compromised, which would in turn compromise the database as a whole. Accordingly, configurations herein substantially overcome the above-described shortcomings by creation of declarative policies which are then compiled into executable code for secure distribution and enforcement. This provides a system which can securely code sign and distribute executable policies to prevent any in-flight tampering. The resulting executable code is embedded in the client application for providing an embedded policy executable entity that performs specific policy access evaluations based on a highly granular consideration of actors, assets and actions taken and returns quick authorizations through embedded library calls or invocations that do not incur a network exchange.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Various configurations depicting the above features and benefits as disclosed herein are shown and described further below. Configurations disclosed herein allow embedded and distributed policy enforcement to extend to network endpoints, typically end users and applications accessing the database. Access authorization occurs at the endpoint via an executable entity on the endpoint system (CPU, server, device) without imposing a barrage of network based exchanges for authorization.

Figure 1:
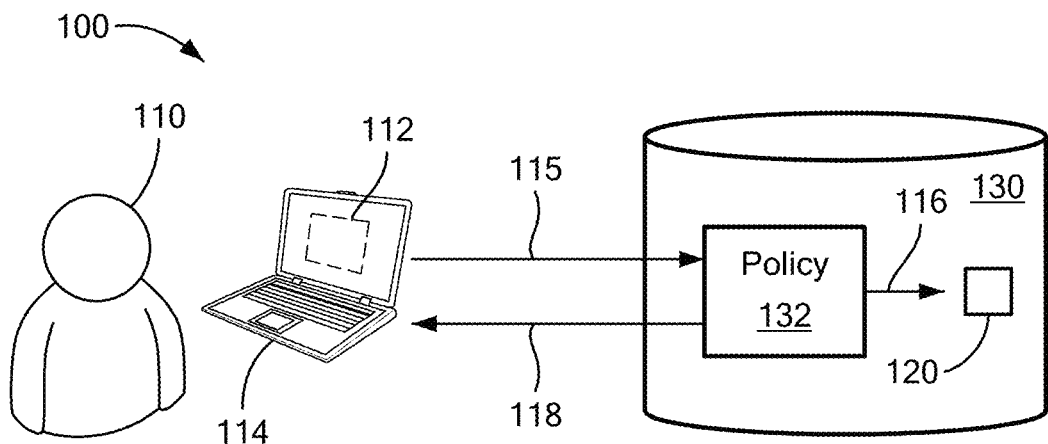
FIG. 1 is a context diagram of a database environment suitable for configurations herein.

FIG. 1 is a context diagram of a data target environment suitable for configurations herein. Traditional data warehouse systems do not provide embedded and distributable access controls to allow/deny end users from retrieving stored data. Embodiments herein describe ways in which persons can control data access for a data warehouse through enforcement of a policy. Referring to FIG. 1, in the data target environment 100, generally, a user 110, such as an employee, seeks some item of information 120 from a data target 130. The data target 130 has an authorization policy 132 (policy) which indicates who may access particular items in the data target 130, and conversely prevents unauthorized access. The user 110 invokes an application 112 on a computing device 114 for requesting the data item 120. The computing device 114 defines an endpoint, meaning a network terminus of the transmission path of the item of information, and the point at which it is disseminated to the user 112. Intermediate transmission points, such as routers, hubs and other network transmission devices merely pass the data item 120 through.

The policy 132 evaluates the request 115 and allows the request to go through, shown by arrow 116, or denies the request and sends an indication 118 accordingly. The policy 132 may be regularly updated to reflect changes in actors (individuals, employees, groups, devices) that may access particular data target objects such as the data item 120, and may vary widely in complexity.

The data target 130 covered by the policy 132 includes any commonly located or distributed collection of data having a common thread, purpose, or ownership and designated for use by a designated user community. Such data target entities include any suitable entity or network location where structured data may be accessed, such as databases, web pages, URL object, JSON (Javascript Object Notation)

files, data warehouses, disk farms, storage servers and the like responsive to the common policy (policy). One particularly beneficial approach is for multidimensional databases, or so-called datacubes, where a number of fields, each defined as a dimension, form a database where generally many of the dimensions may be queried. In implementation, the dimensions are stored as individual tables or files, often on different physical storage entities. The policy 132 protecting the data target 130, therefore, needs to encompass a number of physical access paths, transparently to the user and agnostic to the request 115. Implementation of the policy 132 as an executable entity avoids incurring a network transaction (and associated latency) with each access triggered by a query to the datacube.

Figure 2:
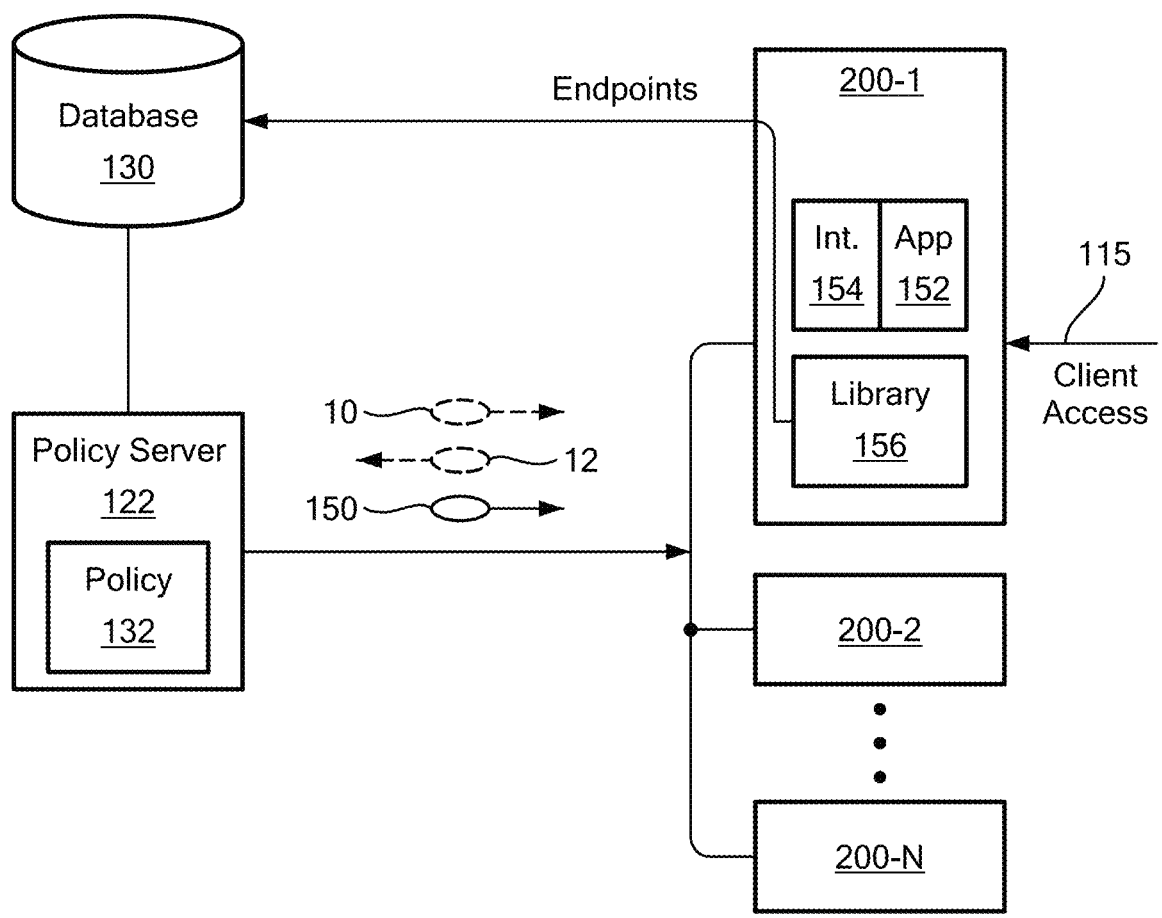
FIG. 2 is block diagram of an embedded executable entity in the environment of FIG. 1.

FIG. 2 is block diagram of an embedded executable entity in the environment of FIG. 1. Referring to FIGS. 1 and 2, the method for implementing the authorization policy 132 (policy) includes compiling an authorization policy into an executable entity 150. The policy 132 is a collection of declarative rules or statements that govern the behaviors of network devices, often in response to human actions. In a business enterprise, for example, network administrators define policies for network devices to follow to achieve business objectives. Most often, a primary consideration is protection of sensitive data. A policy server 122 distributes the executable entity 150 to a plurality of endpoints 200-1 . . . 200-3 (200 generally) of a network of users, and each endpoint 200 of the plurality of endpoints has a client application 152 responsive to the user 110. Each endpoint 200 is defined by a computing device 114 including memory and a processor operable for generating an access request 115. The endpoint 200 embeds the executable entity in the client application 152, such that the executable entity is responsive to access requests 115 from the client application.

The resulting embedded executable entity 154 is codified in executable code in the memory system on which the proxy or embedded application launches and executes. The embedded executable entity 154 grants the access request 115 based on evaluation of the access request 115 against the authorization policy 132, such that evaluating is based only on instructions in the executable entity. Evaluating the access request 115 therefore occurs without network exchanges with the server 122 from which the authorization policy 132 emanated. In contrast, conventional approaches would require a network exchange including an authorization request message 10 and a corresponding response 12, both incurring a network latency. With a large number of queries/requests, such latency becomes untenable, particularly if there is a finer granularity in the authorization approach.

The executable entity 150 may be implemented as a library 156, having an API (Application Programming Interface) and invoked from API calls from the client application 152. The embedded executable entity then takes the form of an API interface 154 invoking the API in the library. The client application 152 is developed with exposure to the API such that the proper calls for policy authorization are embedded in the client application 152.

Updates and revisions to the policy, as well as initial distribution, are performed by storing the embedded executable policy 154 in the endpoint 200. The endpoint then links the library 156 with the client application 152 to resolve references (i.e. calls) to the API from the client application.

Figure 3:
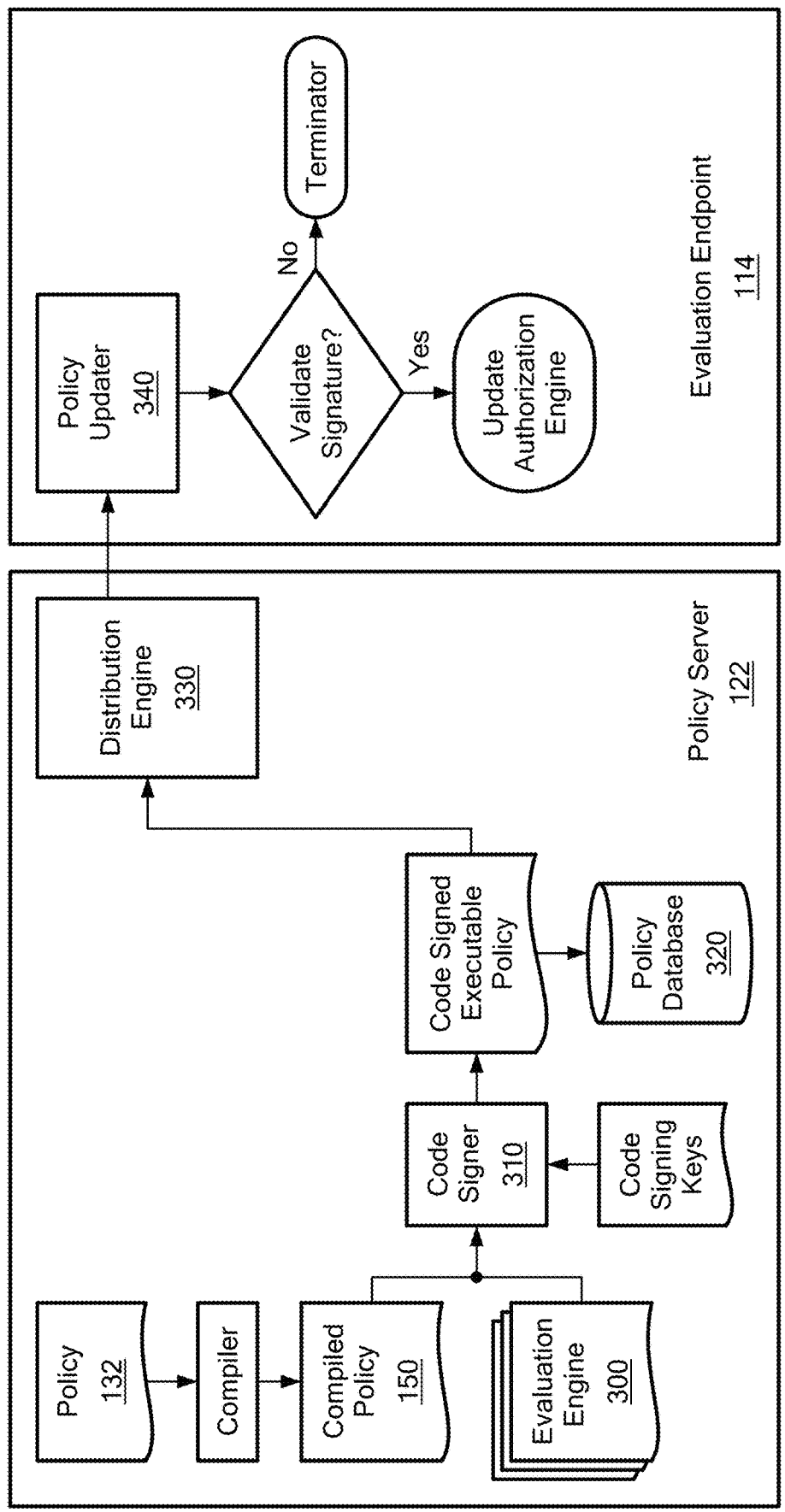
FIG. 3 is a data and logic flow depicting policy distribution as in FIG. 2.

FIG. 3 is a data and logic flow depicting the secure distribution of the policy compiled in FIG. 2. Traditional systems do not provide a clean and secure method for distributing executable policies. Embodiments herein describe ways in which a system can securely code sign and distribute executable policies to prevent any in flight tampering during network transmission.

Referring to FIGS. 1-3, declarative policies are compiled into the executable entity 150 for policy enforcement as in FIG. 2. In FIG. 3, the method for distributing an embedded database authorization policy includes selecting, generating or identifying an authorization policy 132 based on declarative designations of a set of objects, subjects and actions affected by an access request, and compiling the identified authorization policy into an executable entity 150. The overall authorization policy 132 may be representative of one or more declarative policy sets, all of which are compiled into an executable object. An evaluation engine 300 is operable with the executable object (executable entities) for execution and evaluation of the policy embodied by the policy sets.

The objects and the evaluation engine are bundled together into a distributable package which is securely disseminated to all endpoints around the date target 130, typically the database and associated users. A code signer 310 uses a signature to sign the distributable package based on a bundling of one or more of the executable entities and the evaluation engine 300. The evaluation engine 300 is configured for integration with a client application or endpoint 152 responsive to a query requests 115. Once the bundle 302 is created, it is signed and optionally encrypted using code signing keys. This signed policy is stored in a database. A policy database 320 may store the distributable package and the compiled executable entities 150 for iterative distribution to other endpoints 200.

The policy, after signing and storing, is sent to the distribution engine 330. The distribution engine 330 transmits the distributable package including the signed policy executable entity 150 to the computing device 114 at one or more endpoint locations for evaluation.

Each evaluation endpoint(s) will validate the signature on the signed executable. At the computing device 114, a policy updater 340 validates a signature defined by the signed, distributable package and, based on the validation, deploys the executable entities from the distributable package on the computing device. Optionally, the code signer 310 also encrypts the distributable package 302 using a public key encryption mechanism having a key different than a key used for the signing. Invalid signatures will cause no effect and the transmission will be discarded. Optional alarms or events may be generated if an apparent crypto based attack is apparent. Valid signatures will deploy/overwrite the existing policy executable library and/or API 154, 156.

For example, a customer(s) security team is requiring any executables to be signed and encrypted to prevent supply chain hacks. Using the system, the customer can declare policy sets and provide a signing and encryption key (optional). Once a policy 132 is created and ready to be compiled 150 and deployed, the system will automatically use the code signing and encryption key to securely sign and encrypt the policy execution engine 300 (if provided).

This executable policy is then distributed to the evaluation endpoints which it is again verified for correctness and validity. This includes transmitting the distributable package to the computing device 114 at an endpoint location, and validating a signature defined by the signed, distributable package. Based on the validation, the distribution engine 330 deploys the executable entities from the distributable package on the computing device.

Figure 4:
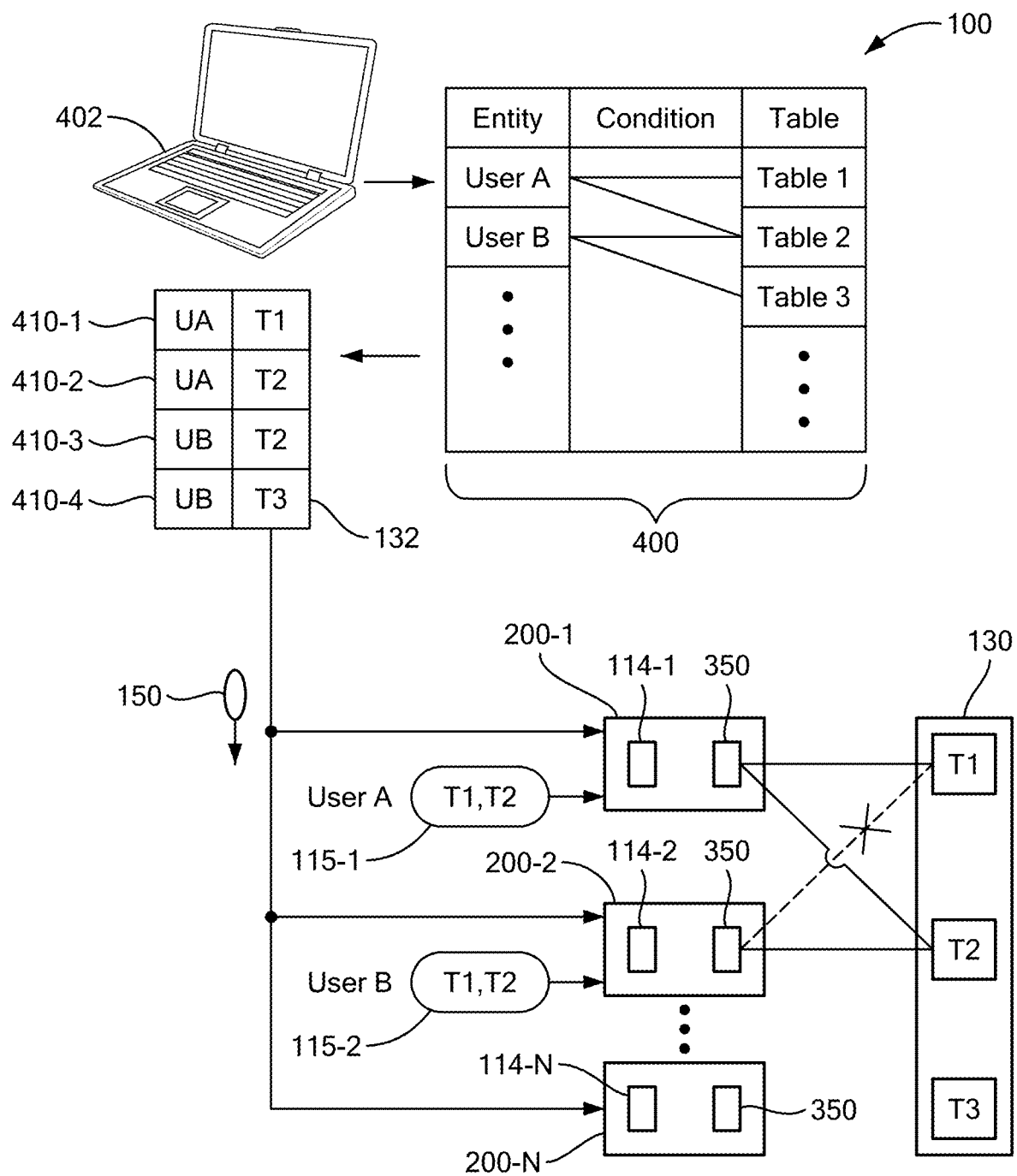
FIG. 4 is an example of access control distributed via executable entities as in FIGS. 1-3.

FIG. 4 is an example of access control distributed via executable entities as in FIGS. 1-3. Referring to FIGS. 1-4, in the data target environment 100, typically a distributed database environment with multiple geographically distinct storage volumes, data access depends on rules between network entities for determining access to data targets 130. Network entities include objects, subjects and actions defined in the access request 115 and directed to at least one of files, tables, users, and network devices. The rules include declarative designations used to generate the authorization policy, where each rule defines a logical expression including at least one network entity and a conditional expression indicative of whether access is permitted. A set of rules 400 includes entries 410 of the declarative designations, usually entered from a security interface device 402 as textual or code syntax.

In the example table shown, the entries 410-1 . . . 410-4 (410 generally) indicate access to data tables T1 . . . T3 by users UA and UB, discussed further below. An implemented rule set likely contains many more users and similar accessors of the data (nodes, applications and other identifiers used to access a database) and finer granularity than an entire table. Further, in a multidimensional database, there may be a large number of tables, each having a specific access regime.

The rules 400 collectively define the authorization policy 132 for dissemination as in FIG. 3. A plurality of endpoints 200 receive the executable entity 150 and, once authenticated by the endpoint computing device 114 as in FIG. 3, instantiate the launched policy executable 350. Each endpoint 200 receives the distributable package at a computing device 114 at an endpoint, such that the endpoint 200 defines a point of network access to a database or data target 130. The endpoint 200 launches the executable entity 150 in the distributable package for permitting selective access to the database by the launched policy executable 350. The authorizing computing device 114 may be a process in the endpoint 200, or may be a separate processor device that governs authentication for the policy executable.

In a typical multidimensional database, policy updates occur periodically at each endpoint for maintaining a consistent authorization policy; in other words, the launched executable at each endpoint 200 represents the same policy 132.

In operation, following policy distribution as in FIG. 3, the endpoint 200 computing device receives an access request 115. The access request undergoes query processing, and results in identification of at least one network entity for which access is sought by the access request, such as tables T1-T3. The endpoint 200 invokes the launched executable entity 350 for evaluation of the identified network entity, and selectively granting access to the identified network entity based on the evaluation.

Referring back to the set of rules 400 codified in the policy, evaluation includes identifying a data target 130, such as one of tables T1-T3 and an accessor such as user A or user B attempting access to the data target 130 via the computing device. Any number of tables, storage volumes, and other storage entities may be included in the data target 130, depending on the database covered by the policy 132. Rather then perform a network exchange for access privileges, the endpoint 200 only need invoke the executable entity 150 for permitting access to the data target by the accessor, and if authorized, complying with the access request based on execution of the launched executable entity 350.

In the example shown, user A (UA) attempts a query 115-1 at endpoint 200-1 that seeks data from T1 and T2. Although the rules may express any suitable condition for a network entity, a typical rule 410 of the set of rules 400 defines an accessor (i.e. a user), a data target such as a table, and a condition defining the access afforded by the accessor to the data target. Rules 410-1 and 410-2 indicate that user A may access tables 1 and 2. The launched executable 350 executes machine instructions based on the rules to perform comparisons for evaluating whether the access request is permissible. Since the policy affords user A table 1 and table 2 access, the query proceeds.

Another access request 115-2 emanates from user B (UB). Rules 410-3 and 410-4, concerning user B, only grant access to tables T2 and T3. Since the policy 132 does not include privileges to access T1, the launched executable entity 350 executing instructions denies the access request based on the performed comparisons.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for enforcing an authorization policy, comprising:
    identifying an authorization policy based on declarative designations of a set of network entities affected by an access request;
    compiling the identified authorization policy into an executable entity;
    signing a distributable package based on a bundling of one or more of the executable entities for enforcement of the authorization policy;
    transmitting the distributable package including the bundled executable entity to a computing device at one or more endpoint locations;
    receiving the distributable package at a computing device at an endpoint, the endpoint defined by a point of network access to a database; and
    launching the executable entity in the distributable package for permitting selective access to the database by evaluating an access request based on instructions in the executable entity.

2. The method of claim 1 further comprising:
receiving an access request by the endpoint computing device;
identifying at least one network entity for which access is sought by the access request;
invoking the executable entity for evaluation of the identified network entity; and
selectively granting access to the identified network entity based on the evaluation.

3. The method of claim 1 further comprising:
receiving an access request by the endpoint computing device;
identifying a data target and an accessor attempting access to the data target via the computing device;
invoking the executable entity for permitting access to the data target by the accessor, and
complying with the access request based on execution of the executable entity.

4. The method of claim 1 further comprising:
executing machine instructions based on the declarative designations, the machine instructions performing comparisons for evaluating whether the access request is permissible; and
executing instructions denying the access request based on the performed comparisons.

5. The method of claim 1 further comprising generating the authorization policy based on a set of rules, each rule defining a logical expression including at least one network entity and a conditional expression indicative of whether access is permitted.

6. The method of claim 5 wherein each rule of the set of rules defines an accessor, a data target and a condition defining the access afforded by the accessor to the data target.

7. The method of claim 1 further comprising encrypting the distributable package using a public key encryption mechanism validating the signature by one or more endpoint locations.

8. The method of claim 1 further comprising storing the distributable package and the compiled executable entities in a policy database for iterative distribution to other endpoints.

9. The method of claim 1 wherein the network entities include objects, subjects and actions defined in the access request and directed to at least one of files, tables, users, and network devices.

10. A network computing device for providing controlled access to a database, comprising:
an authorization policy based on declarative designations of a set of network entities affected by an access request;
a processor connected to a compiler for compiling the identified authorization policy into an executable entity;
a code signer for signing a distributable package based on a bundling of one or more of the executable entities for enforcement of the authorization policy; and
a network interface to a network endpoint for database access for transmitting the distributable package including the bundled executable entity to a computing device at one or more endpoint locations, the endpoint location configured to receive the distributable package, the endpoint location defined by a point of network access to a database; and
launch the executable entity in the distributable package for permitting selective access to the database by evaluating an access request based on instructions in the executable entity.

11. The device of claim 10 further comprising:
an access request received by the endpoint computing device, the access request indicative of at least one network entity for which access is sought by the access request;
the executable entity configured for evaluation of the identified network entity, and operable to selectively grant access to the identified network entity based on the evaluation.

12. The device of claim 10 further comprising:
an access request received by the endpoint computing device;
a data target and an accessor attempting access to the data target via the computing device; and
wherein the executable entity is invocable for permitting access to the data target by the accessor, the network endpoint responsive to enforce the access request based on execution of the executable entity.

13. The device of claim 10 further comprising:
machine instructions compiled based on the declarative designations, the machine instructions configured to perform comparisons for evaluating whether the access request is permissible, wherein the instructions are indicative of denial of the access request based on the performed comparisons.

14. The device of claim 10 further comprising a set of rules for generating the authorization policy, each rule defining a logical expression including at least one network entity and a conditional expression indicative of whether access is permitted.

15. The device of claim 14 wherein each rule of the set of rules defines an accessor, a data target and a condition defining the access afforded by the accessor to the data target.

16. The device of claim 10 further comprising a code signer for encrypting the distributable package using an encryption mechanism for enabling validation of the signature by one or more endpoint locations.

17. The device of claim 10 further comprising a policy database for storing the distributable package and the compiled executable entities for iterative distribution to a plurality of endpoints.

18. An executable entity embodying program code on a non-transitory medium that, when executed by a processor, performs steps for implementing a method for rendering and enforcing an access control check, the method comprising:
identifying an authorization policy based on declarative designations of a set of network entities affected by an access request;
compiling the identified authorization policy into an executable entity;
signing a distributable package based on a bundling of one or more of the executable entities for enforcement of the authorization policy;
transmitting the distributable package including the bundled executable entity to a computing device at one or more endpoint locations;
receiving the distributable package at a computing device at an endpoint, the endpoint defined by a point of network access to a database; and launching the executable entity in the distributable package for permitting selective access to the database by evaluating an access request based on instructions in the executable entity.

* * * * *